United States Patent
Wallis

(10) Patent No.: US 8,238,409 B2
(45) Date of Patent: Aug. 7, 2012

(54) MANAGING TAP POSITIONS IN A DIGITAL DELAY LINE

(75) Inventor: Mark Wallis, Mouans Sartoux (FR)

(73) Assignee: ST-Ericsson SA, Geneva (CH)

( * ) Notice: Subject to any disclaimer, the term of this patent is extended or adjusted under 35 U.S.C. 154(b) by 795 days.

(21) Appl. No.: 11/720,835

(22) PCT Filed: Nov. 30, 2005

(86) PCT No.: PCT/IB2005/053964

§ 371 (c)(1),
(2), (4) Date: Jan. 8, 2010

(87) PCT Pub. No.: WO2006/059281

PCT Pub. Date: Jun. 8, 2006

(65) Prior Publication Data

US 2010/0103996 A1 Apr. 29, 2010

(30) Foreign Application Priority Data

Dec. 3, 2004 (EP) .................................... 04300844

(51) Int. Cl.
*H04B 1/00* (2006.01)

(52) U.S. Cl. ........ 375/147; 375/130; 375/316; 375/350; 375/354; 375/355; 370/442; 370/503; 370/517

(58) Field of Classification Search .................. 375/130, 375/147, 316, 350, 354, 355; 370/442, 503, 370/517

See application file for complete search history.

(56) References Cited

U.S. PATENT DOCUMENTS 6,639,956 B1 * 10/2003 Song ............................. 375/354

(Continued)

FOREIGN PATENT DOCUMENTS

EP 0973264 A1 7/1998

(Continued)

OTHER PUBLICATIONS

Kalle Tuulos: "3GPP FDD Baseband Test Data Generator"[Online] Feb. 2002, pp. 1-45, XP002443495 University of Turku Retrieved from the Internet: URL:http://gamma.nic.fi/~ktt/kalle/ktuulos_gradu_release.pdf> [retrieved on Jul. 19, 2007].

(Continued)

*Primary Examiner* — Leon Flores
(74) *Attorney, Agent, or Firm* — William J. Kubida; Peter J. Meza; Hogan Lovells US LLP

(57) ABSTRACT

This method of reading a plurality of chip sample values at tap positions (66, 68) in a digital delay line (64) having a starting point and an end point for delaying symbols of a signal (82) received in a receiver comprises:—reading the plurality of chip sample values in the digital delay line (64) at the tap positions (66, 68) according to a chip rate clock (70) having a chip rate clock cycle and a chip rate clock frequency,—oversampling the received signal (82) according to a sample rate clock (84) having a sample rate clock cycle and a sample rate clock frequency to produce a plurality of chip sample values supplied in the digital delay line (64), the sample rate clock frequency being higher than the chip rate clock frequency,—shifting the tap positions (66, 68) towards either the starting point or the end point of the digital delay line (64), and—adjusting the chip rate clock cycle when shifting the tap positions.

9 Claims, 8 Drawing Sheets

U.S. PATENT DOCUMENTS

| | | | |
|---|---|---|---|
| 7,076,678 B2 * | 7/2006 | LaBerge | 713/401 |
| 2003/0231703 A1 | 12/2003 | Lugil | |

FOREIGN PATENT DOCUMENTS

| | | | |
|---|---|---|---|
| EP | 1376886 | A1 | 6/2002 |
| EP | 1351405 | A1 | 4/2003 |
| WO | 02/29975 | A2 | 4/2002 |

OTHER PUBLICATIONS

Harju L et al: "Flexible implementation of a WCDMA rake receiver" Signal Processing Systems, 2002. (SIPS '02). IEEE Workshop on Oct. 16-18, 2002, Piscataway, NJ, USA,IEEE, Oct. 16, 2002, pp. 177-182, XP010616597 ISBN: 0-7803-7587-4.

IPER, PCT/IB2005/053964, mailing date Aug. 8, 2007, pp. 8.

* cited by examiner

MANAGING TAP POSITIONS IN A DIGITAL DELAY LINE

FIELD OF THE INVENTION

The present invention relates to adjusting tap positions in a digital delay line of a mobile receiver.

BACKGROUND OF THE INVENTION

In UMTS (Universal Mobile Telecommunications Service) data processing, data pertaining to different propagation paths reach a mobile station at different instants of time. Moreover, said data may reach the mobile station from the same or different transmitting sources, i.e. base stations. The information transmitted in each path in the air interface is sampled, demodulated and delayed at the receiver, and then combined with the correspondingly processed information of the other paths to improve the quality of the received signals.

Typically, for code-division multiple access (CDMA) systems, spreading is used to translate each symbol into a sequence of chips. At the transmitter end, each symbol is multiplied by a wideband spreading code.

A CDMA wireless communication system, such as the 3GPP UMTS standard, comprises several base stations and several pieces of mobile user equipment (UE). Downlink data destined for the pieces of user equipment located in a particular base station's coverage area (cell) is spread in frequency prior to transmission using a direct spreading sequence code (called "spreading code" in the UMTS standard).

Due to the fact that a receiver is mobile, multiple propagation paths normally taken by the signal have different lengths and different attenuation resulting in a superposition of multiple, delayed, attenuated versions of the transmitted signal reaching the user equipment antenna. When the user equipment is in motion relative to a base station, the length of the propagation paths from base station to user equipment will change with time, so the corresponding delays will vary. Typically, a set of digital delay lines are used to realign the delayed versions of the signal before recombining them. The delay line may be envisaged as a shift register of length L, with a read pointer corresponding to a tap in the delay line. Arriving symbols are written to the start of the delay line, and in each symbol period all symbols are shifted one place along it. The content of the delay line at the tap is read every symbol period, resulting in a delayed version of the input symbol stream. The amount of delay is determined by the position of the tap, which should be programmable.

A more efficient implementation uses a single delay line before despreader units. This delay line has several taps, each of which is positioned corresponding to a different path delay. The output of each tap is a delayed version of the unprocessed, sampled input signal. If the tap outputs are each fed to a despreader unit, and the same scrambling code sequence alignment is used in each unit, the output of the despreaders will be a set of aligned symbol streams, which can be recombined without further ado.

The length of the delay line determines the maximum delay spread that can be accommodated by the receiver. The delay spread is defined as the maximum difference in the delay of the shortest propagation path and the longest propagation path, in the set of all possible paths (i.e. paths whose signal-to-noise ratio is sufficient for an acceptably low error rate).

To minimize cost, a delay line length will be set to the minimum required to accommodate the delay spread and the difference between base station timings.

The position of the taps in the delay line must be adjusted continually to realign the symbol streams.

As a result, it is likely that after a short period of time, one or more taps may reach the end or the start of the delay line. If the delay continues to change, it will no longer be possible to track the path, which will be lost.

The aim of the invention is to provide a mechanism for adjusting the position of the delay line with respect to the path timing, which avoids the loss of a path even with a reduced length for the delay line. The function of this mechanism is to move all the taps towards either the beginning or the end of the delay line, without losing the alignment of the symbols, nor the scrambling code sequences used for despreading.

SUMMARY OF THE INVENTION

According to a first aspect of the invention, it is an object to provide a method of adjusting tap positions in a receiver according to claim 1.

One or more of the features of the sub-claims may also be included.

The invention provides several advantages.

The invention has the advantage that no chips in a symbol are lost when the tap position adjustment is performed. This advantage is more pronounced in cases where a low spreading factor (e.g., number of chips per symbol) is considered because one chip represents a larger proportion of the symbol power.

Another advantage is that unlike complex despreader units that are typically required in receivers, the despreader units in the receivers of the present invention are simpler and thus more cost effective. They need not compensate for missing or additional chips in the symbol because it is not required to skip or repeat chips in the scrambling code sequence generators.

Other features and advantages of the invention will be apparent from the following detailed description, and from the claims.

DESCRIPTION OF PREFERRED EMBODIMENTS

Figure 1:
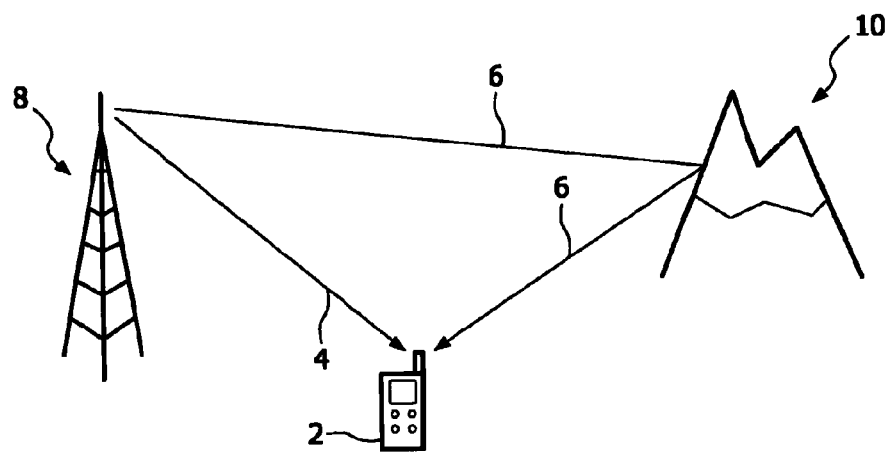
FIG. 1 is a schematic diagram of multiple propagation paths.

Referring to FIG. 1, user equipment 2 is subject to multiple propagation paths of a signal, namely, a shorter propagation path 4 and a longer propagation path 6. The signal 4 is transmitted directly from a base station 8 to the user equipment 2, whereas the signal 6 propagates first from the base station 8 to a barrier 10 and then from the bather 10 to the user equipment 2.

The user equipment 2 takes advantage of the multiple propagation paths normally taken by the signal. Since each of these propagation paths contains useful signal power, it is worthwhile for the user equipment 2 to despread and decode them. Furthermore, the different propagation paths are subject to different interference and fading conditions. Hence the probability of errors occurring simultaneously on all paths is lower than the probability of errors on any single path.

Figure 2:
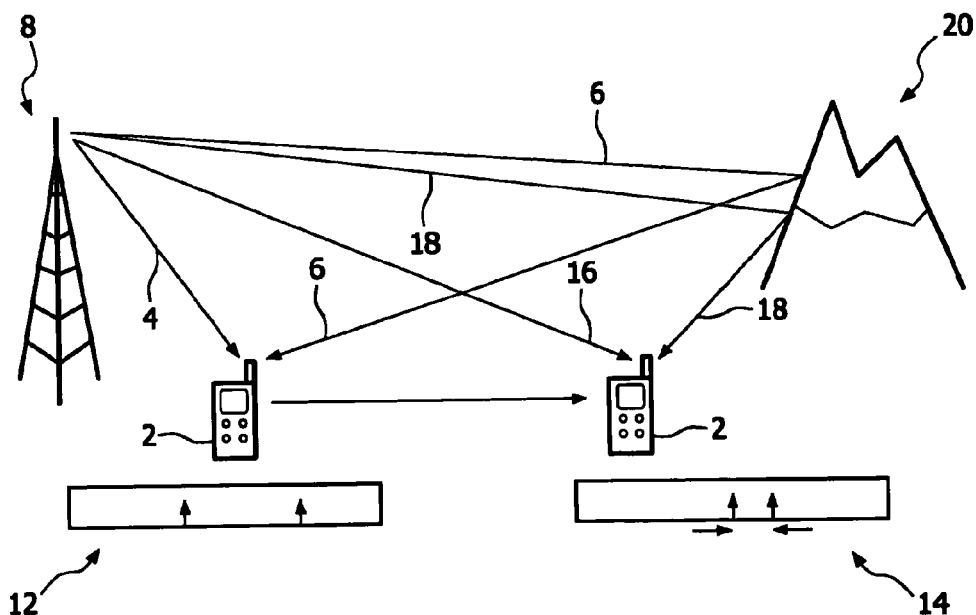
FIG. 2 is a schematic diagram of multiple propagation paths with mobile user equipment.

Referring now to FIG. 2, when the user equipment 2 is in motion relative to the base station 8, the length of the propagation paths from the base station 8 to the user equipment 2 will change with time, so the corresponding delays will vary. In other words, if the user equipment 2 moves from a position 12 to a position 14, the paths 4 and 6 become paths 16 and 18, respectively. Any error in the user equipment's reference frequency with respect to the network will also cause a drift in the perceived arrival time at the user equipment 2. This requires that the path delays be measured regularly and the tap positions be updated to maintain the alignment between the symbols. The scrambling and spreading code sequence timing must be adjusted as well. For example, a delay locked loop may be used to control this adjustment.

In UMTS, the information transmitted in each path in the air interface is sampled, demodulated, and delayed at the receiver. Then, it is combined with the correspondingly processed information of the other paths to improve the quality of the received signals.

Figure 3:
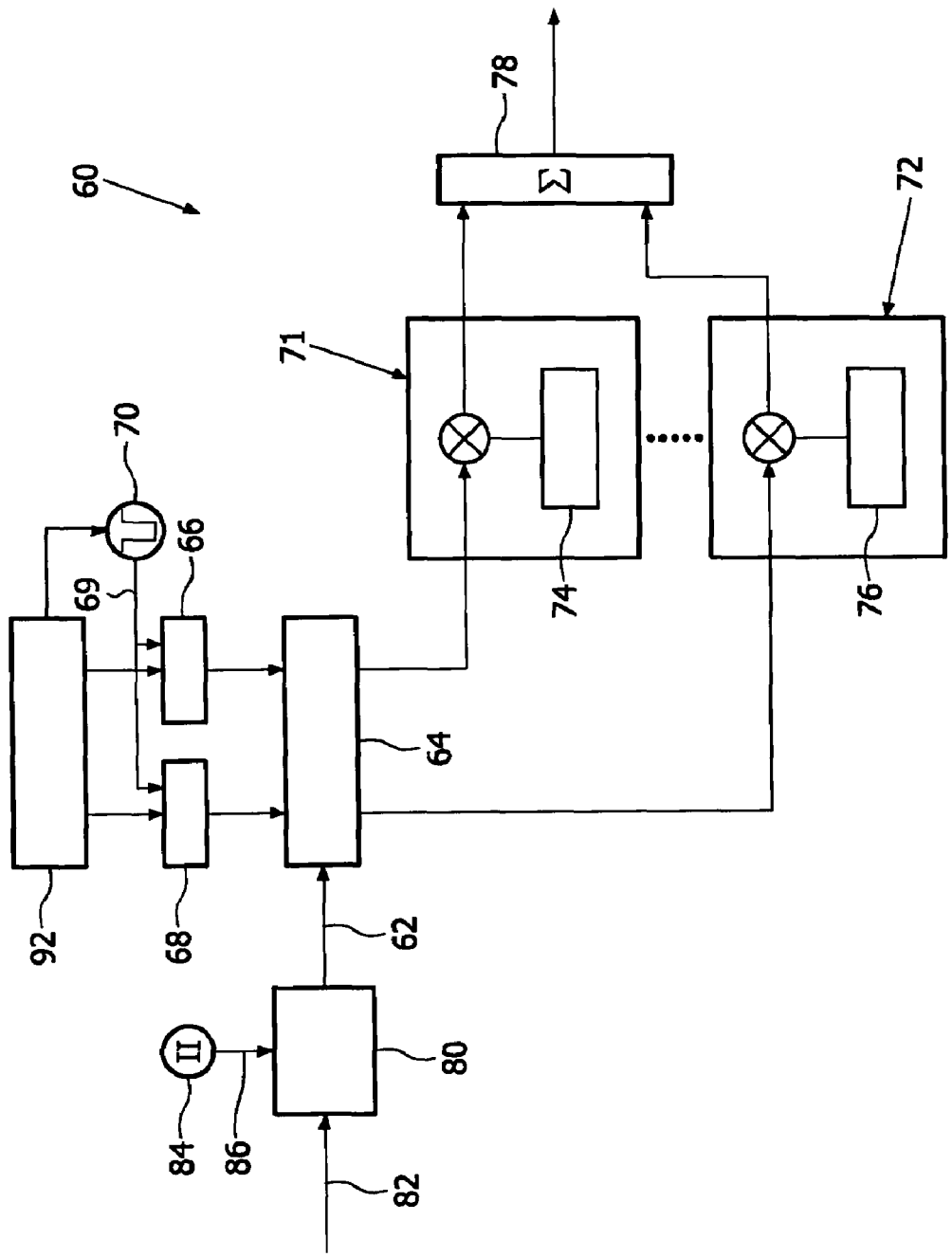
FIG. 3 is a schematic diagram of a receiver with combined delay line implementation.

Referring to FIG. 3, an implementation of a receiver 60 is shown. The receiver 60 includes a single delay line 64 for receiving signal samples 62. In this particular embodiment the delay line 64 comprises a shift register with several read pointers 66, 68 corresponding to taps. Each reader tap 66 and 68 is adapted to read a data chip in the delay line 64 at a chip rate clock frequency 69 provided by a chip rate clock 70. Taps 66 and 68 are used to read the signal samples 62 before the samples are passed on to despreader units 71 and 72. The despreader units 71 and 72 include scrambling code sequence generators 74 and 76, respectively.

The despreader units 71 and 72 are adapted to demodulate the received chips that are transmitted to the receiver 60. First, the chips are descrambled, i.e., demodulated by a scrambling code provided by scrambling code generators 74 and 76. Subsequently the descrambled chips are despread into symbols.

Then, the despread symbols from different paths are recombined in an integrator 78. In other words, each of the taps 66 and 68 of the delay line 64 are positioned corresponding to a different path delay. The outputs of each of the taps 66 and 68 are a delayed version of the unprocessed, sampled input signal. If the tap outputs are each fed to the despreader units 71 and 72 and the same scrambling code sequence alignment is used in each unit, the output of the despreaders 71 and 72 will be a set of aligned symbol streams, which can be recombined in the integrator 78.

According to the invention, an oversampler 80 is arranged at the input of the delay line 64. The oversampling rate is denoted $K_{os}$. Thus, the signal samples 62 are oversampled points of a signal 82 received by the receiver 60. The oversampler 80 is connected to a sample rate clock 84 which provides a sample rate clock signal 86 having a sample rate clock cycle $\tau$.

As a result, all the samples are written into and propagate through the delay line 64 at a sample rate clock frequency, $F_{os}=1/\tau$. Therefore, the samples corresponding to a particular chip are read at position N and time T, or equally at position N−1 and time T−$\tau$, where $\tau$ defines the oversampling period: $\tau=1/F_{os}$. Moreover, the delay line length L is multiplied by $K_{os}$, compared to a delay line which operates at the chip rate clock frequency, $F_c$. This is further illustrated with reference to FIG. 5 below.

A control unit 92 is provided to move the position of taps 66 and 68 when necessary in particular for re-aligning the symbols provided by different paths and supplying to the despreader units the values having the optimum sampling position within a chip. The control unit 92 is also adapted to shorten or to lengthen the chip rate clock cycle provided by the chip rate clock 70.

Figure 4:
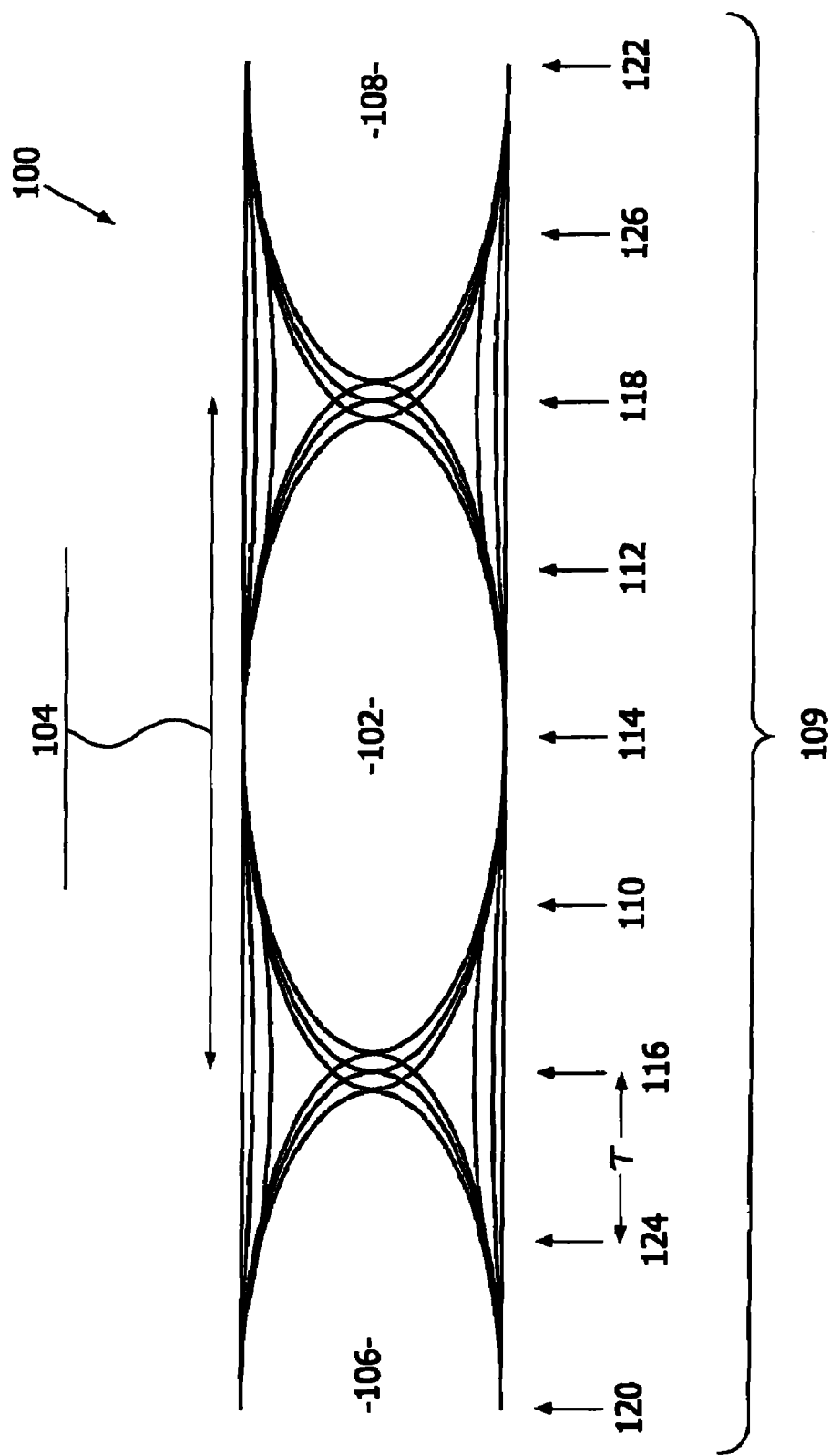
FIG. 4 is a schematic diagram of an eye diagram.

Referring to FIG. 4, an optimization for adjusting the delay line taps is shown using the illustration of a plot of a received data eye diagram 100 as a function of $\tau$ and its signal. An eye opening 102 consumes a cycle time of a one chip period 104. FIG. 4 also lists the transition times of adjacent eye openings 106 and 108. The eye openings 102, 106, and 108 include several sampling positions or points because of oversampling points 109. For example, the eye opening 102 has two sampling positions 110 and 112 with reduced SNR (Signal-to-noise Ratio) and an optimal sampling position 114. FIG. 4 shows that the optimal sampling position for a chip is precisely in the middle, with samples which do not correspond to the middle of the chip period 104 having a reduced SNR. Sampling positions 116 and 118 list only noise and sampling positions 120 and 122 list optimal sampling points of the eye openings 106 and 108, respectively, whereas sampling positions 124 and 126 list the reduced SNR sampling points of the same.

Therefore, the generation of the oversampling points 109 permits accurate measurement of the path delay. This makes the actual values input onto the despreader units correspond to the optimal sampling positions, i.e., positions 114, 120, 122. The oversampling optimization also allows the SNR at different sampling positions such as positions 110-126 to be compared and the selection of the best position.

Figure 5:
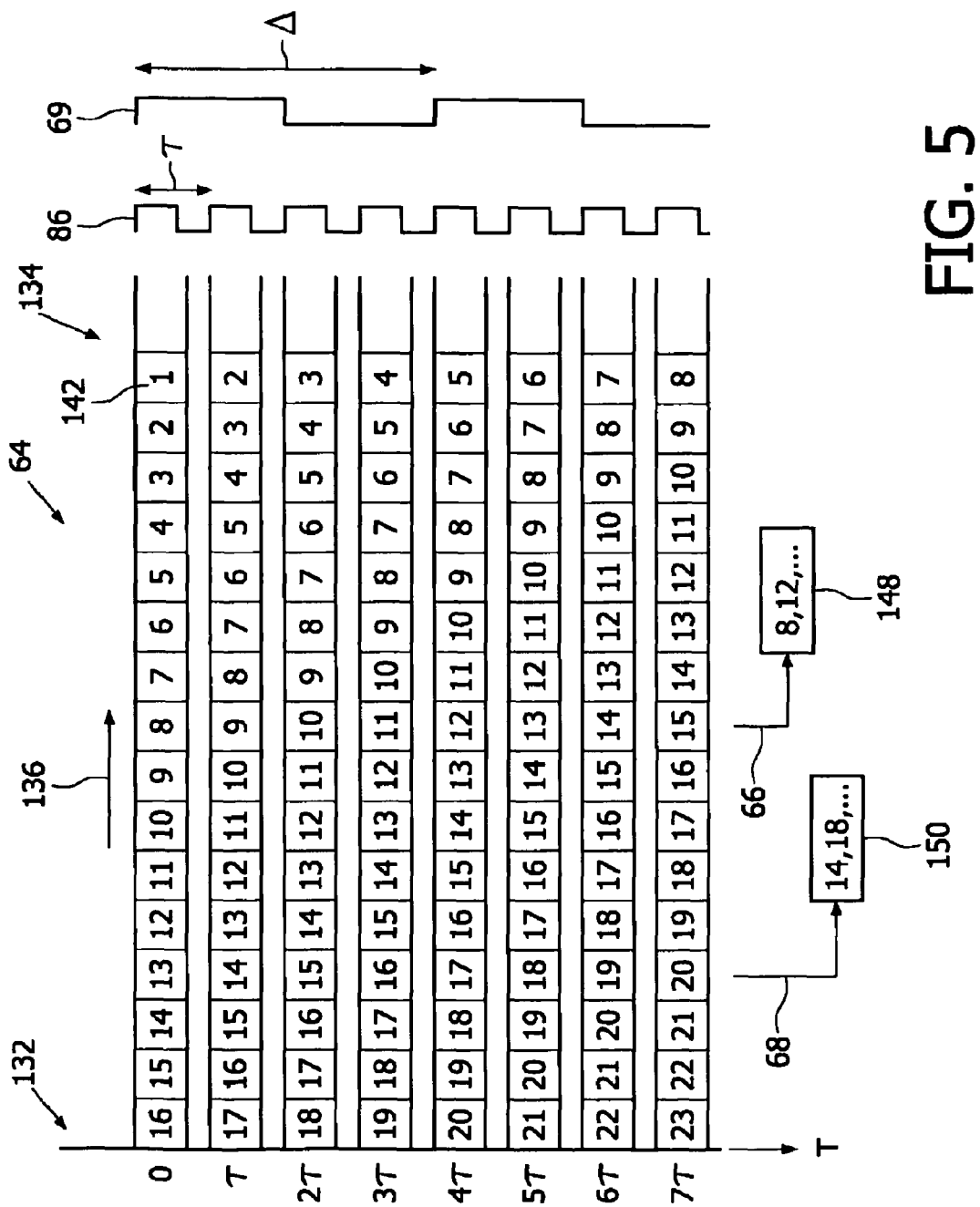
FIG. 5 is a schematic diagram of a delay line read implementation.

Referring now to FIG. 5, a read synchronization of the delay line 64 is shown. In this read synchronization, the delay line 64 has a starting point 132 and an ending point 134. In this example, the delay line 64 shifts direction from the starting point 132 to the ending point 134 as indicated by an arrow 136. The delay line 64 is oversampled at $\tau$ the oversampling period, i.e., $\tau 0$, $2\tau$, $3\tau$, $4\tau$, $5\tau$, $6\tau$, $7\tau$ and so forth. Thus, the oversampling occurs at the sample rate clock 86 at a sample rate clock cycle $\tau$ and the sample (e.g., sample value 1 circled in 142) is read according to the chip rate clock 70 normally at a chip rate clock cycle $\Delta$ having the chip rate clock frequency 69. In other words, the sample rate clock 84 is cycled at a higher frequency than the chip rate clock 70.

For example, when all the taps 66, 68 are moved by one delay line position, the samples read at time T will no longer correspond to the optimal chip sampling position, but to an adjacent one. This will result in a degradation of the SNR for the corresponding symbol stream. Hence, the moment at which the samples are read from the delay line 64 must be adjusted by the sample rate clock cycle $\tau$. Furthermore, after repeated moves in one direction, the scrambling code sequence in the despreader will no longer be aligned with the chip samples received from the delay line taps such as taps 66 and 68. Thus, the moment in T at which each chip of the scrambling code sequence is generated is adjusted by τ at the same time as the taps 66 and 68 are moved or shifted under the control of the control unit 92.

Summarizing, the generation of the scrambling code sequence chips and the reading of the chip sample values from the delay line at the taps 66 and 68 are synchronised by a clock whose frequency corresponds to the chip rate clock frequency, $F_c$. Consequently, on every rising edge of the chip rate clock 70, the scrambling code sequence is advanced by one chip and a new set of values is read from the delay line 64. As indicated by the output sequences 148 and 150 corresponding respectively to the taps 66 and 68, the sample values 8 and 12 are read by the tap 66 and sample values 14 and 18 are read by the tap 68 in accordance with the chip rate clock 70.

Figure 6:
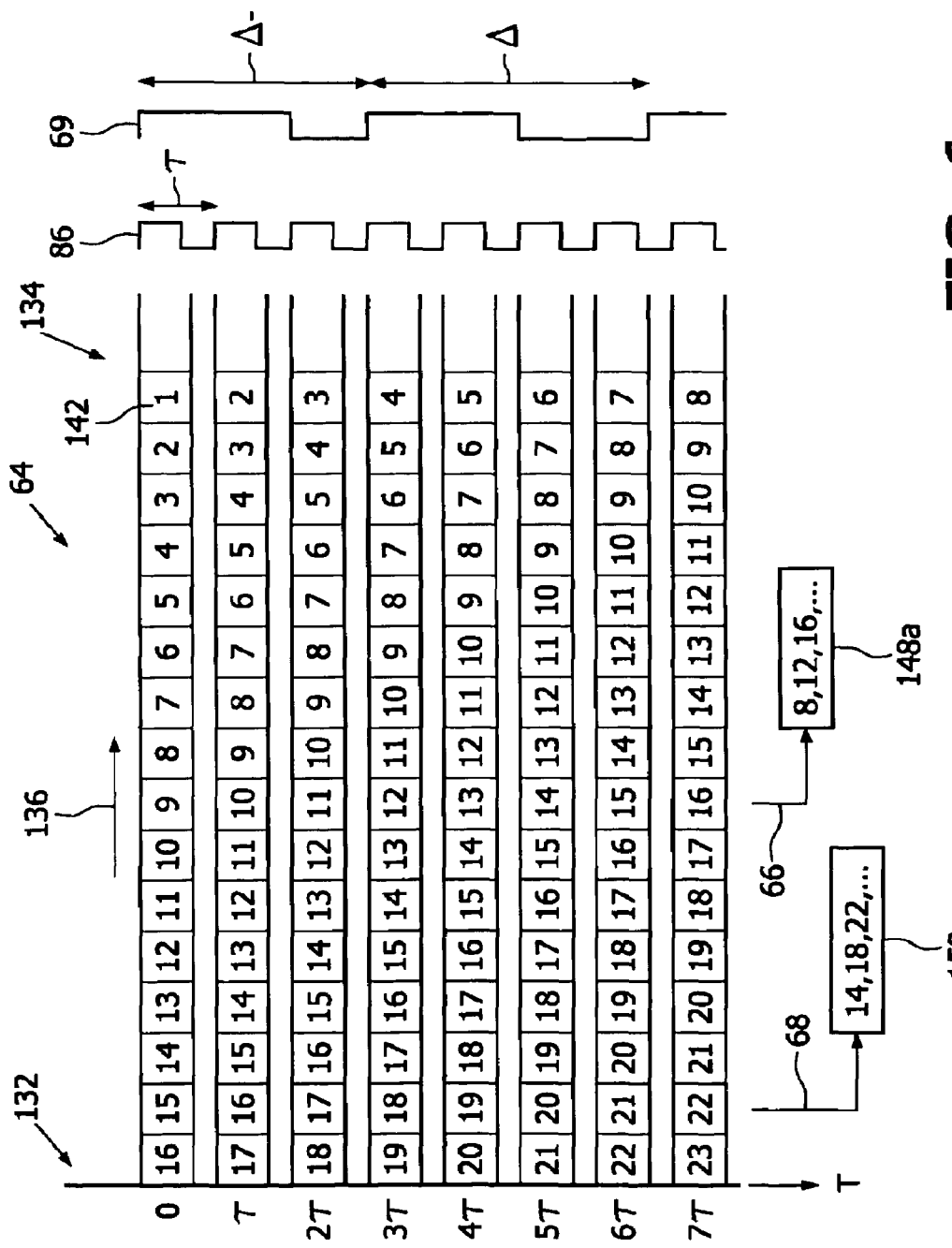
FIG. 6 is a schematic diagram of a delay line read implementation of FIG. 5 with tap positions moving towards the starting point of the delay line.

According to the invention, and as shown in FIG. 6, when the control unit 92 moves the position of the taps 66 and 68 by one towards the starting point 132 of the delay line 64 at a time T, the chip rate clock cycle Δ− of the chip rate clock 70 is adjusted. In particular, the chip rate clock cycle Δ− is shortened when the tap positions 66 and 68 are shifted towards the starting point 132 in the delay line 64. Thus, as the position of the taps is moved, the chip rate clock cycle Δ− is shortened simultaneously by τ. Thereafter, the chip rate clock cycle Δ− continues at the chip rate clock frequency of the chip rate clock 70, with data chips being read at the chip rate clock cycle Δ of FIG. 5. But the moment at which the samples are read out is still aligned with the optimal sampling position of the chips, given the new delay line tap positions. Furthermore, the scrambling code chips are generated at a time τ earlier than previously generated.

Hence, even after successive repetitions of the operation, the sequence remains aligned with the incoming chip stream. Thus, output sequences 148a and 150a corresponding to the taps 66 and 68 respectively, result in the sample values 8, 12, 16 and 14, 18, and 22. As expected, the values of the output sequences 148a and 150a are identical with the output sequences 148 and 150 of FIG. 5.

Figure 7:
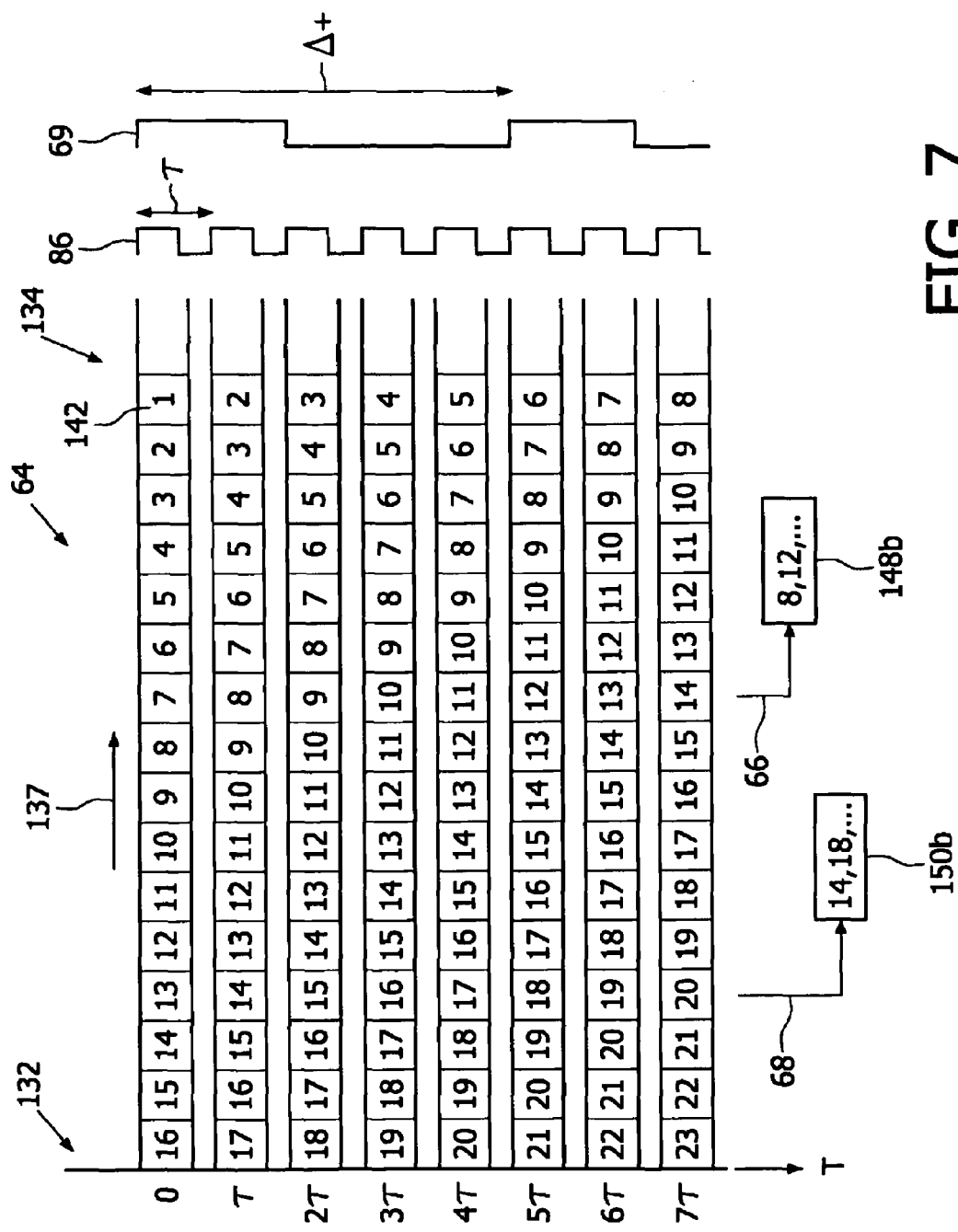
FIG. 7 is a schematic diagram of a delay line read implementation of FIG. 5 with tap positions moving towards the end point of the delay line.

Similarly, referring to FIG. 7, when the position of the taps 66 and 68 needs to be moved one position towards the ending point 134 of the delay line 64, the chip rate clock cycle Δ is extended by τ to yield a chip rate clock cycle Δ+ delaying the moment at which the sample values 142 are read from the delay line 64, as well as the generation of the scrambling code sequence chips. Thus, in this particular situation, adjusting the chip rate clock cycle Δ+ of the chip rate clock 70 includes lengthening the chip rate clock cycle Δ+ to shift the tap position towards the ending point 134 of the digital delay line.

By making the clock frequency, i.e., the sample rate clock 84 for shifting the samples through the delay line 64, higher than the clock frequency 69 used to read the chips, i.e., the chip rate clock 70, and adjusting the chip rate clock cycle Δ to shift the tap position towards either the starting point or the end point, it is not necessary to skip or repeat a chip, thus removing all performance degradations. In particular, the tap pointers 66 and 68 are adjusted during the shortening and lengthening of the chip rate clock cycle Δ, before the read takes place, for example, on the falling edge of the chip clock. This ensures that the read pointers are already aligned with the optimal sampling position when the read occurs, as shown in references 148b and 150b with result sample values 8, 12 and 14, 18, respectively.

Moreover, using the above method, because the chip is still present, there is no need to compensate for the skipped or added chip in the despreader. This greatly reduces the complexity of the despreaders.

Furthermore, the size of the adjustments corresponds to the granularity of the path tracking algorithm. As described, oversampling permits the optimal sampling point within the chip to be detected and tracked. The tracking granularity is the sample rate clock cycle, τ, i.e., the tracking mechanism adjusts the tap position in steps of τ. If a particular signal path is chosen as the reference to which all other signal paths will be time aligned, then each time this reference path delay changes, and hence the corresponding delay line tap moves, all the taps are moved in the opposite direction, in order to maintain the reference path tap in the same position (e.g., at the center of the delay line). If the taps were constrained to move in steps of one whole chip period such as 104 as in FIG. 4, it would be necessary to accumulate the movement of the reference path position tap, so that the delay line is moved only when this tap has moved $K_{os}$ steps in one direction. Therefore, with the optimization in the present method, the delay line management is streamlined and simplified. On the other hand, given a displacement in the same direction at the same speed compared to the one chip adjustment, the operation of the present method is performed $K_{os}$ times more frequently.

Figure 8:
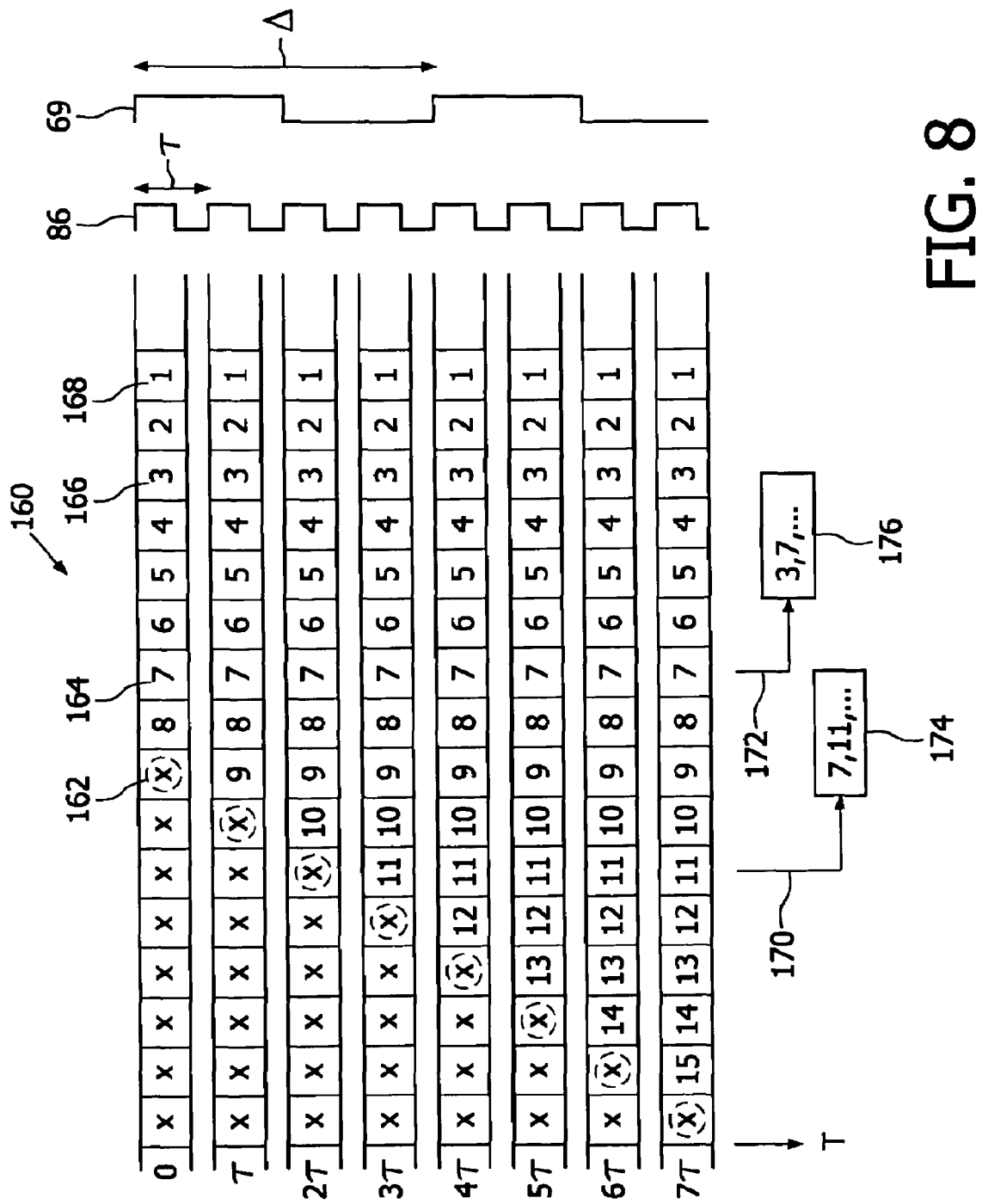
FIG. 8 is a schematic diagram of a wider delay line read implementation using a RAM storage.

Referring now to FIG. 8, an alternative implementation for longer delay lines is shown. In this embodiment, the delay line comprises a random access memory (RAM) 160 rather than the shift register as a storage medium for the sample chips received. The delay line 160 includes a write tap pointer 162, read pointers 164 and 166, a sample value 168 indicated as 1, and tap pointers 170 and 172. The tap pointers 170 and 172 produce output sequences 174 and 176, respectively, according to the sample rate clock signal 86 and the chip sample readings generated by the chip rate clock frequency 69.

In the digital delay line 160, the write tap pointer 162 of the RAM has an address that indicates the starting point of the delay line 160 and the address is incremented with every sample rate clock cycle. In other words, the start of the delay line 160 is indicated by a new sample being written at every cycle to the memory address pointed to by the write tap pointer 162. The taps 170 and 172 are implemented using read pointers 164 and 166, which contain the memory addresses from which to read the samples, as shown in references 174 and 176 with result sample values 7, 11 and 3, 7 respectively. The read pointers 164 and 166 are incremented by the oversampling rate, $K_{os}$, at every cycle of the chip rate clock 70. The position of each tap with respect to the beginning of the delay line 160 is given by the address in the read pointers 164 and 166 relative to the address in the write pointer 162.

Figure 9:
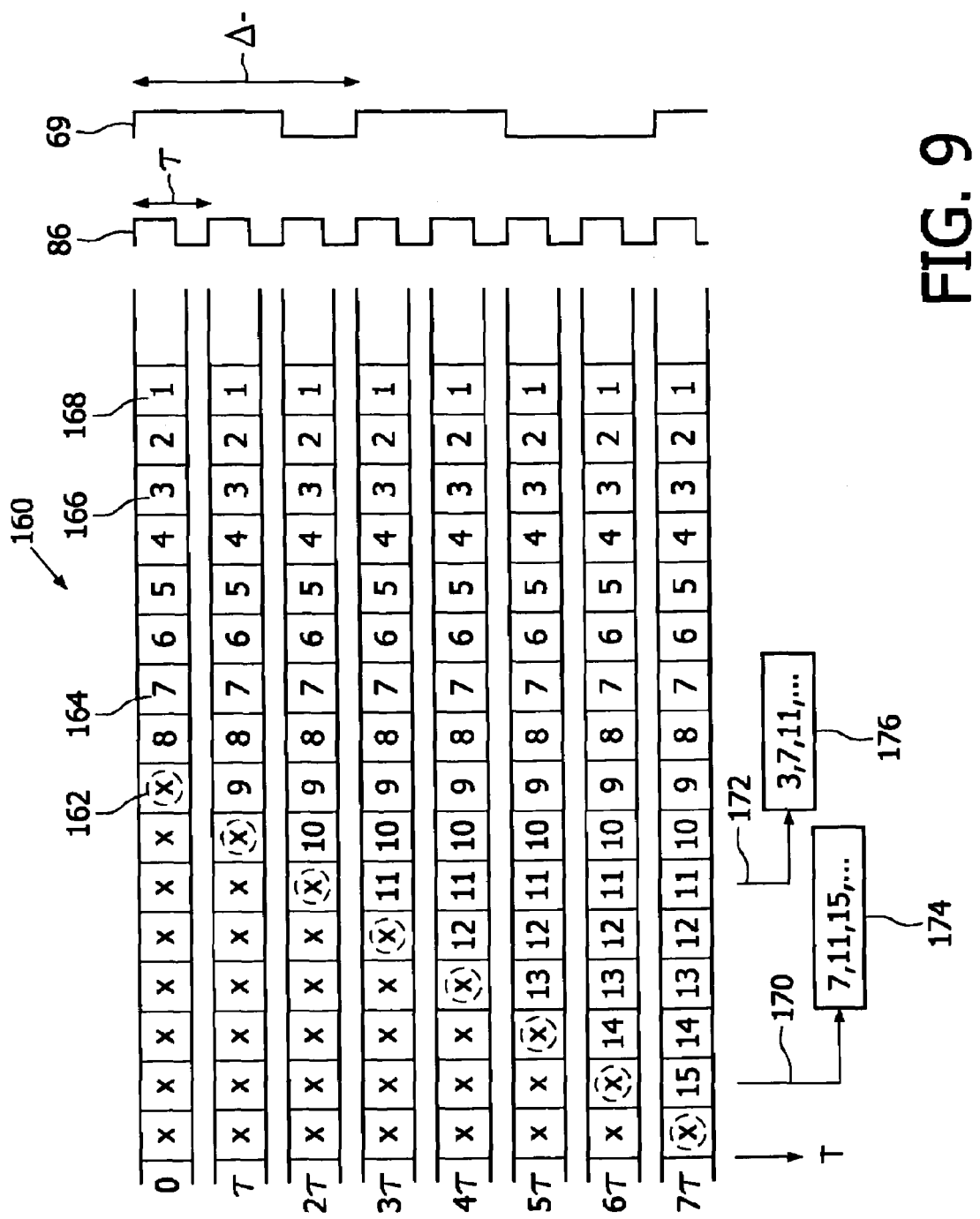
FIG. 9 is a schematic diagram of the wider delay line read implementation of FIG. 8 with tap positions moving towards the end point of the delay line.

Referring now to FIG. 9, the method for adjusting the tap positions described in FIG. 6 applies equally to a RAM memory-based implementation of FIG. 9. Like the shift-register implementation of FIG. 6, the pointer taps 170 and 172 are moved by adjusting the read pointers 164 and 166 by one sample period 86 and simultaneously shortening the chip rate clock cycle Δ− or lengthening it during one cycle in the chip rate clock 70, as shown in references 174 and 176 with result sample values 7, 11, 15 and 3, 7, 11 respectively.

It is to be understood that whereas the invention has been described in conjunction with the detailed description thereof, the foregoing description is intended to illustrate and not limit the scope of the invention, which is defined by the scope of the appended claims. Other aspects, advantages, and modifications are within the scope of the following claims.

The invention claimed is:

1. A method of reading a plurality of chip sample values of a sequence of chips in an CDMA system at tap positions in a digital delay line having a starting point and an end point for delaying symbols of a signal received in a receiver of a CDMA system, the method comprising:
reading the plurality of chip sample values in the digital delay line at the tap positions according to a chip rate clock having a chip rate clock cycle and a chip rate clock frequency, said taps being used to read signal samples before they are passed to despreader units,
oversampling the received signal according to a sample rate clock having a sample rate clock cycle and a sample rate clock frequency to produce a plurality of chip sample values supplied in the digital delay line, the sample rate clock frequency being higher than the chip rate clock frequency,
shifting the tap positions towards either the starting point or the end point of the digital delay line, and
adjusting the chip rate clock cycle when shifting the tap positions, wherein the adjusting of the chip rate clock cycle further includes:
shortening the chip rate clock cycle of the chip rate clock when shifting the tap positions towards the starting point of the digital delay line, or lengthening the chip rate clock cycle of the chip rate clock when
shifting the tap positions towards the end point of the digital delay line reading the plurality of chip sample values in the digital delay line at the tap positions according to a chip rate clock having a chip rate clock cycle and a chip rate clock frequency.

2. The method of claim 1, wherein the adjusting of the chip rate clock cycle comprises shortening or lengthening the chip rate clock cycle by one sample rate clock cycle.

3. The method of claim 1, wherein it comprises determining a plurality of sampling positions of a chip and comparing different sampling positions to choose an optimal sampling position having an increased signal-to-noise ratio and in that the adjusting of the chip rate clock cycle comprises aligning the reading of the plurality of chip sample values with the optimal sampling positions of the chips.

4. The method of claim 1, wherein the plurality of tap positions are adjusted during the shortening or lengthening steps, before the plurality of chip sample values are read so that the plurality of tap positions have already been aligned with the optimal sampling chip position.

5. The method of claim 1, wherein the plurality of chip sample values are read from a shift register storage.

6. The method of claim 1, wherein the plurality of chip sample values are read from a random access memory storage.

7. A receiver of a CDMA system for receiving a signal made of symbols, the receiver including means for reading the plurality of chip sample values of a sequence of chips in an CDMA system in the digital delay line at the tap positions according to a chip rate clock having a chip rate clock cycle and a chip rate clock frequency,
means for oversampling the received signal according to a sample rate clock having a sample rate clock cycle and a sample rate clock frequency to produce a plurality of chip sample values supplied in the digital delay line, the sample rate clock frequency being higher than the chip rate clock frequency, said means comprising an oversampler which is arranged at the input of the delay line, and a sample rate clock which is connected to the oversampler;
said digital delay line comprising means for shifting the tap positions towards either the starting point or the end point of the digital delay line,
means for adjusting the chip rate clock cycle and controlling to move the positions of the taps when shifting the tap positions, wherein the means is arranged as
shortening the chip rate clock cycle of the chip rate clock when shifting the tap positions towards the starting point of the digital delay line, or
lengthening the chip rate clock cycle of the chip rate clock when shifting the tap positions towards the end point of the digital delay line, and
means for providing the chip rate clock cycle and a chip rate clock frequency for the tap positions,
means for reading the plurality of chip sample values in the digital delay line at the tap positions according to a chip rate clock having a chip rate clock cycle and a chip rate clock frequency, said taps being used to read signal samples before they are passed to despreader units.

8. The receiver of claim 7, wherein the delay line comprises a shift register to read the plurality of chip sample values.

9. The receiver of claim 7, wherein the delay line comprises a random access memory storage to read the plurality of chip sample values.

* * * * *